United States Patent [19]

Tsuji

[11] 4,371,261
[45] Feb. 1, 1983

[54] RANGE FINDER

[75] Inventor: Sadahiko Tsuji, Yokohama, Japan

[73] Assignee: Canon Kabushiki Kaisha, Tokyo, Japan

[21] Appl. No.: 196,442

[22] Filed: Oct. 14, 1980

[30] Foreign Application Priority Data

Oct. 16, 1979 [JP] Japan ................. 54-133403

[51] Int. Cl.³ .............................................. G01C 3/08
[52] U.S. Cl. ............................. 356/1; 354/25; 356/4
[58] Field of Search .............. 356/1, 4; 354/25 R, 354/25 A, 31; 362/309

[56] References Cited

U.S. PATENT DOCUMENTS

| 2,081,134 | 5/1937 | Buckley | 356/1 |
| 3,431,449 | 3/1969 | Hundley | 362/309 |
| 3,443,502 | 5/1969 | Harvey | 356/1 |

FOREIGN PATENT DOCUMENTS

| 2916314 | 10/1979 | Fed. Rep. of Germany | 356/1 |
| 55-65109 | 5/1980 | Japan | 356/1 |

Primary Examiner—S. C. Buczinski
Attorney, Agent, or Firm—Toren, McGeady and Stanger

[57] ABSTRACT

An active type of range finder includes a beam projection lens which is formed by a number of parts each having a different optical axis for use in a beam projection optical system, and a beam receiving optical system for widening the range finding angular field without lowering range finding accuracy.

2 Claims, 7 Drawing Figures

RANGE FINDER

BACKGROUND OF THE INVENTION

1. Field of the Invention

The present invention relates to an optical system of the active range finder type.

2. Description of the Prior Art

An automatic focusing camera, including a light source and a light receiving element for scanning an object with light beams from the light source, and for receiving the light beams reflected from the object in order to focus, has been proposed in a variety of forms. For example, U.S. Pat. No. 3,443,502 discloses a method of projecting a modulated light beam for scanning, the scanning movement and a focus adjusting device being associated with each other, and stopping the focus adjusting device at a point where the light beam crosses a photo-electric light receiving element. Also disclosed is a method of flickering a plurality of light sources for carrying out scanning, and a method of selectively receiving modulated light beams from a fixed light source by a plurality of photo-electric light receiving elements.

A so-called field of view for range finding, in an active range finder of the above type, is determined by the size of the image of the light source projected onto an object by a beam projection lens.

Along with the recent technical development of light emitting diodes, and infrared light emitting diodes, such diodes have been used as a light source. While this type of element is of small size and has high efficiency, any image projected by it appears as a relatively small spot. Therefore, such an element can only provide spot range finding with a narrow field of view. It has the advantage of enabling precise focusing of an object being viewed, but when it is desired to focus on a particular part of the object, it is necessary to find a range, project the beam onto the part of the object and then to determine the composition of the picture frame before releasing the shutter, which constitutes added handling.

In order to widen the field of view for range finding, a beam projection lens may be made having a short focal length to provide a wide angle beam projection, but to obtain good range finding accuracy it is desirable to have a long focal length for the beam projection lens.

That is, referring to FIG. 1, when the amount of shifting of a light beam is expressed by "x"; a length of a base line between a beam projection lens and a beam receiving lens is represented by "a"; the focal length of the beam projection lens is expressed by "$f_1$"; while the length to an object is represented by "R", there is a relationship among these factors as shown below:

$R = a \cdot f_1 / x,$ $dR/dx = -R_2/a \cdot f_1$

When the length of base line a, and the accuracy of positional control for the amount of shifting of light source dx are constant, the accuracy of object distance dR is in an inverse proportion with $f_1$.

That is, the longer the focal length, the higher the focusing accuracy becomes. Therefore, the field of view for range finding and the accuracy in range finding are two elements in an inverse relationship with each other.

SUMMARY OF THE INVENTION

The present invention overcomes the above shortcomings, and is intended to widen the field of view for range finding while the focal distance of a beam projection lens is maintained constant, and to form a plurality of projected images. That is, a so-called fly-eye lens having a plurality of optical axes is provided as a beam projection lens, so that a plurality of light source images are formed on an object by one light source.

Accordingly, if the light receiving element is sufficiently large, the images can all be received, thus there is no lowering of efficiency. Therefore, the field of view for range finding can be widened, while the range finding accuracy is maintained.

If the light receiving element has a relatively small receiving area, such as a silicon photo-diode, only a portion of the plurality of images can be received and efficiency is lowered. Therefore, in another embodiment of the present invention, a similar fly-eye lens is provided in front of the light receiving element for overcoming this shortcoming so that images at a position corresponding to projected images are all formed on a light receiving element with a small area, wherein the field of view for range finding is widened without sacrificing accuracy or efficiency.

DETAILED DESCRIPTION OF THE PREFERRED EMBODIMENTS

Figure 1:
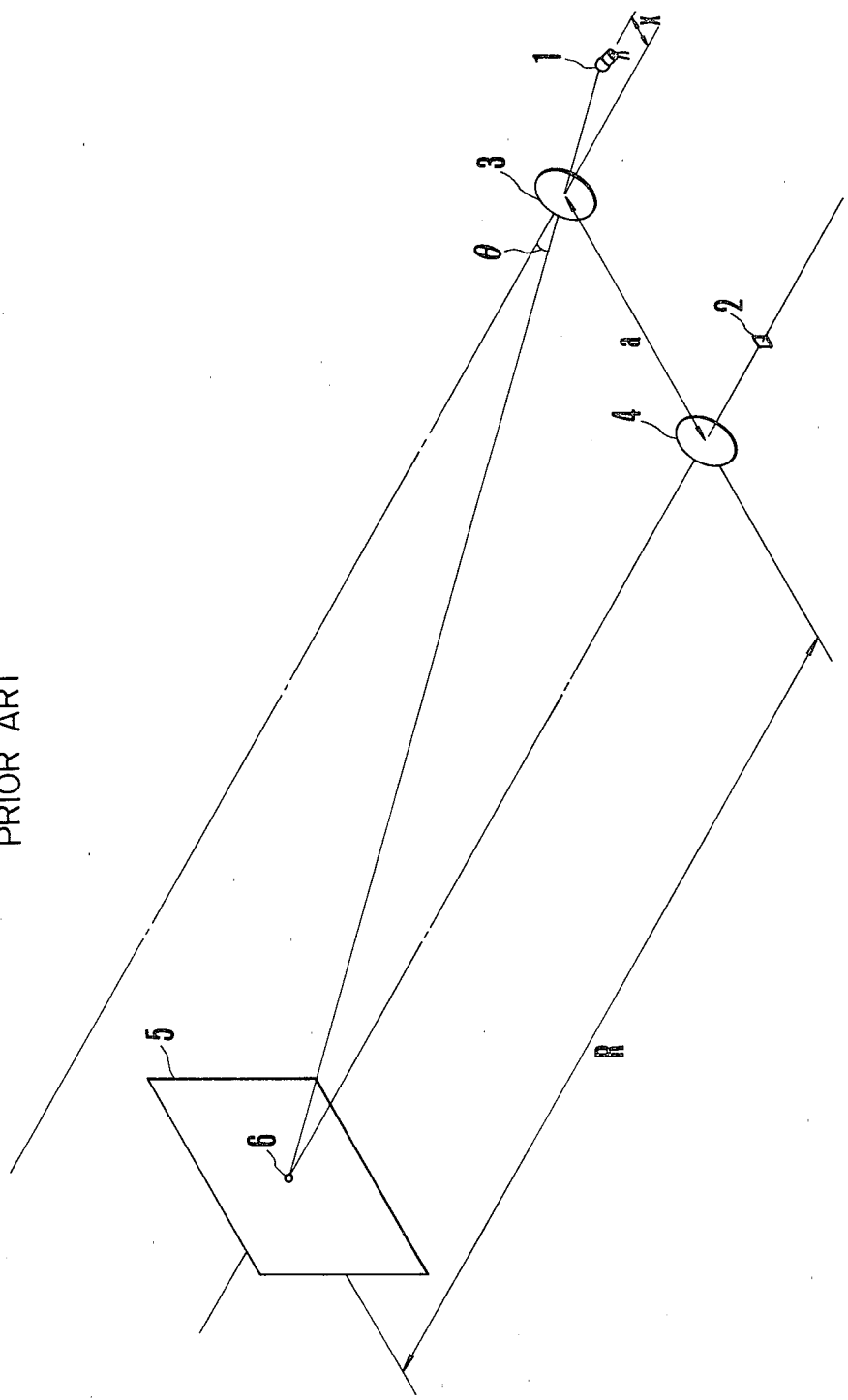
FIG. 1 shows the basic principle of a range finder optical system.

In FIG. 1, a beam projection lens 3 with a focal distance $f_1$ is placed in front of a light emitting element 1 which emits a modulated visible light beam or an infrared light beam, and a light receiving lens 4 with a focal length $f_2$ is placed at a position separated from the lens 3 by a base line distance a. Also, a light receiving element 2 is placed in the rear of the lens 4. The light emitting element 1 is shifted in a lateral direction to scan an object 5 by the light beam projected from said element 1, and when the light beam reflected from the object is imaged on the light receiving element 2 through the lens 4, a distance R to the object is obtained from the amount x of shifting of the light emitting element using the above-mentioned formula.

In this case, the field of view for range finding is the size of an image 6 projected by the projection lens 3. Thus, when the size of the light emitting element is 0.5 mm, and the focal length $f_1$ of the projection lens is 20 mm, while the distance to the object is 1 meter, the image formed will be a spot with a size of about 20 mm.

Figure 2:
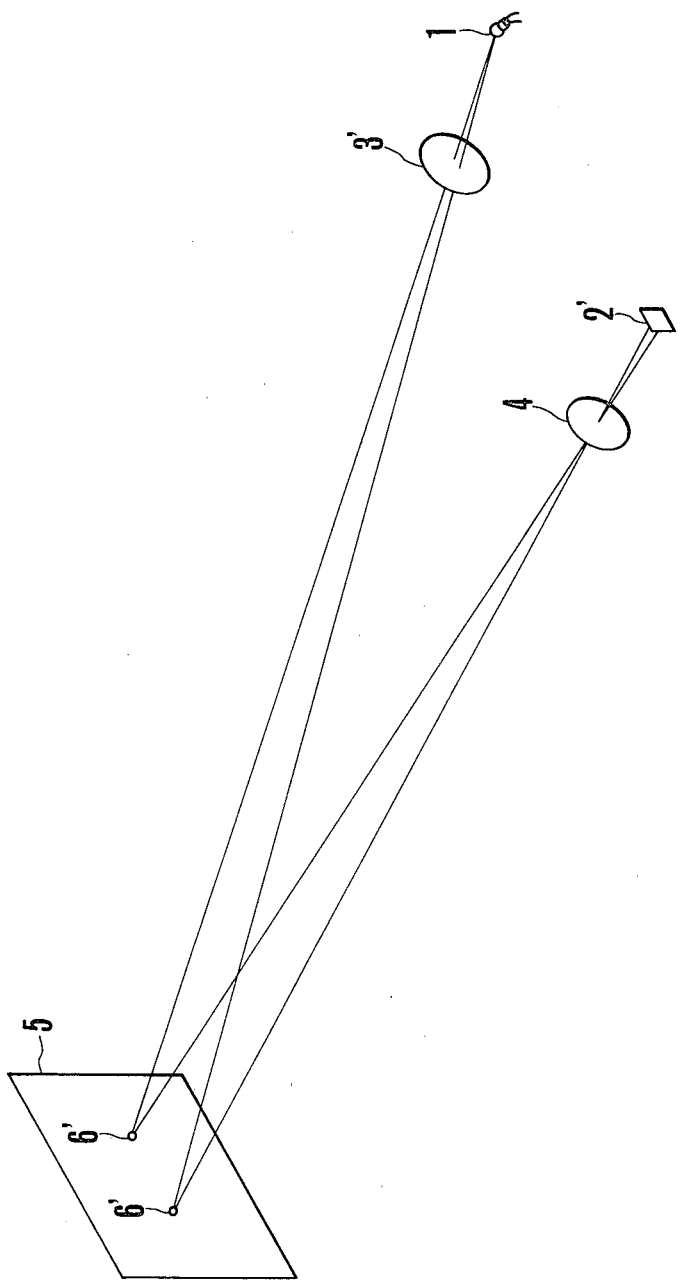
FIG. 2 shows a layout in the first example of the present invention.

FIG. 2 shows one example of the present invention. Here, a beam projection lens 3' having two optical axes is provided in place of the beam projection lens 3 in FIG. 1. Light beams from a light emitting element form two spots 6' on an object 5 by the projection lens 3'. A distance $d_2$ between said two spots is determined by $$d_2 \approx d_1 \cdot R / f_1$$

wherein the distance between the two optical axes in the lens 3' is represented by $d_1$, and the focal length is represented by $f_1$, while the distance to the object is expressed by R. If $d_2$ is too large, it results in measuring a distance to two object points having different object distances, generating an error in range finding as focusing is done on an object point with a larger amount of reflected light or on a point between two object points. In the drawing, a case wherein light receiving is made sufficiently large so that two images of the spots 6' can be both received, is shown. Therefore no loss in the amount of light takes place, thus no lowering of efficiency occurs.

Figure 3:
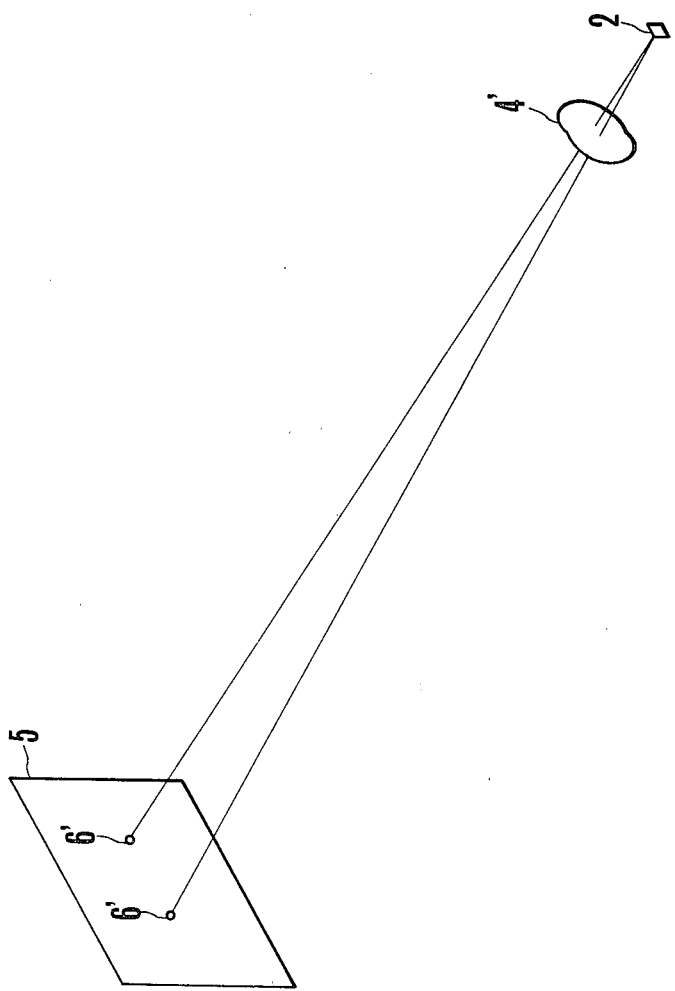
FIG. 3 shows a layout in the second example of the present invention.

However, when a light receiving element having small area such as a silicon photo-cell is used, two images of the spots 6' are difficult to be received. The second example of the present invention provides a light receiving lens having two optical axes in front of a light receiving element in order to overcome said shortcoming. FIG. 3 shows an arrangement thereof. That is, a light receiving lens 4' having a focal length $f_2$ and having a distance $d_2$ between optical axes is so placed in front of a light receiving element 2 that two images of spots 6' are formed on the light receiving element 2. When a relation, $$d_3 \approx d_2 \cdot R / f_2$$

is satisfied, said imaging relationship can be satisfied. Since images being split into two are formed on one element in this case, there is no lowering of efficiency.

While explanations were made above for a light emitting and light receiving optical system having two optical axes in the Examples 1 and 2, exactly the same effect can be realized by a so-called fly-eye lens having a plurality of optical axes.

Now, outputs of the light receiving elements in the Examples 1 and 2 are studied.

Figure 4:
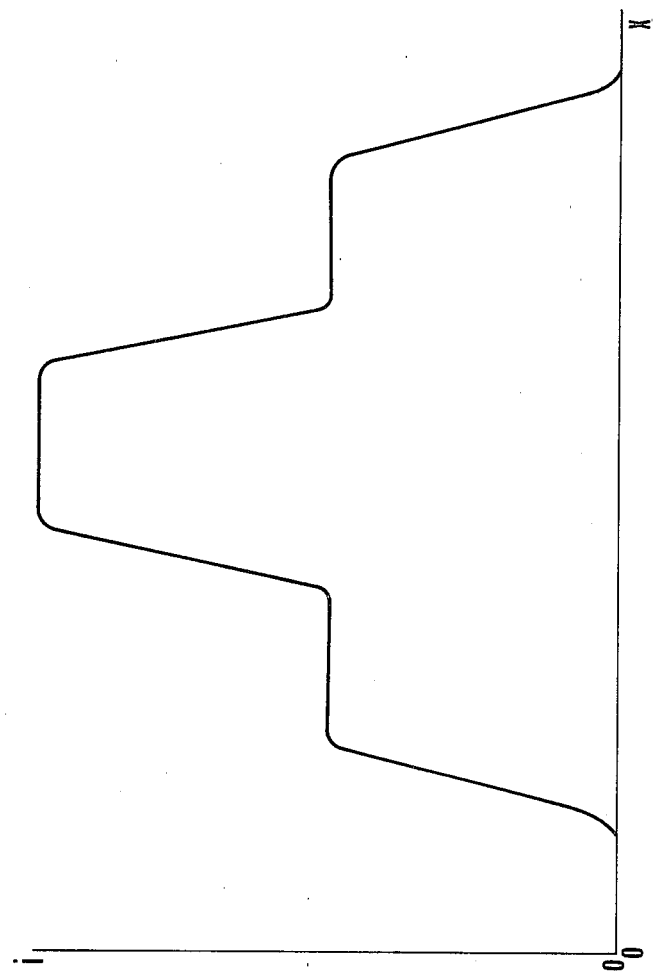
FIG. 4 is a line diagram to show outputs of a light receiving element in the first example.
Figure 5:
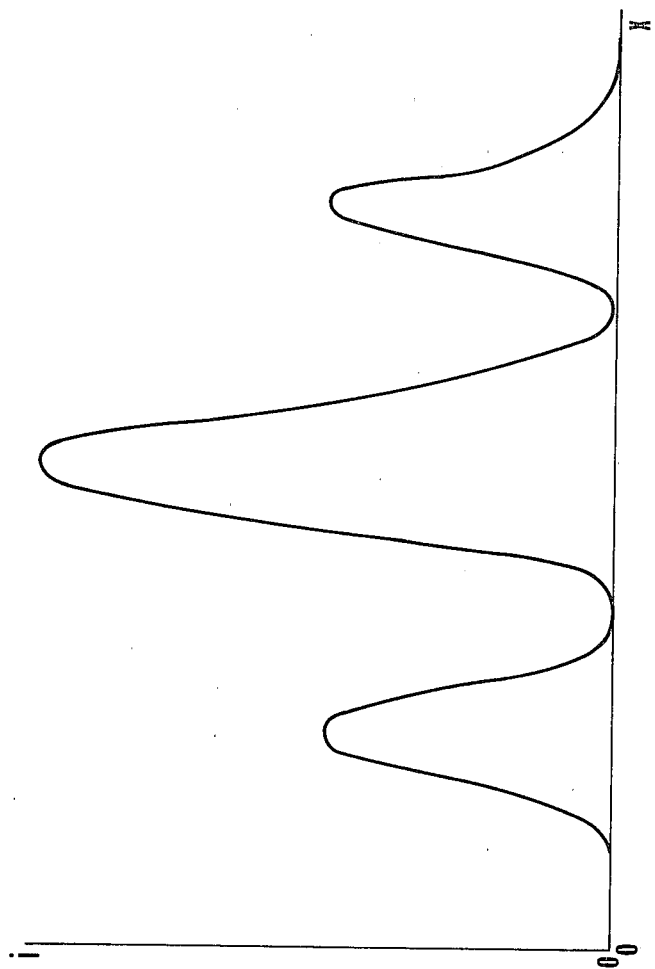
FIG. 5 is a line diagram to show outputs of a light receiving element in the second example.

In Example 1, outputs as shown in FIG. 4 and in Example 2, outputs as shown in FIG. 5 can be obtained. When a peak value detection system is used in a range finder circuit, the amount of shifting x can be detected from the output of said circuit, but when limit value detection is done by differential detection, erroneous range detection may result.

Figure 6:
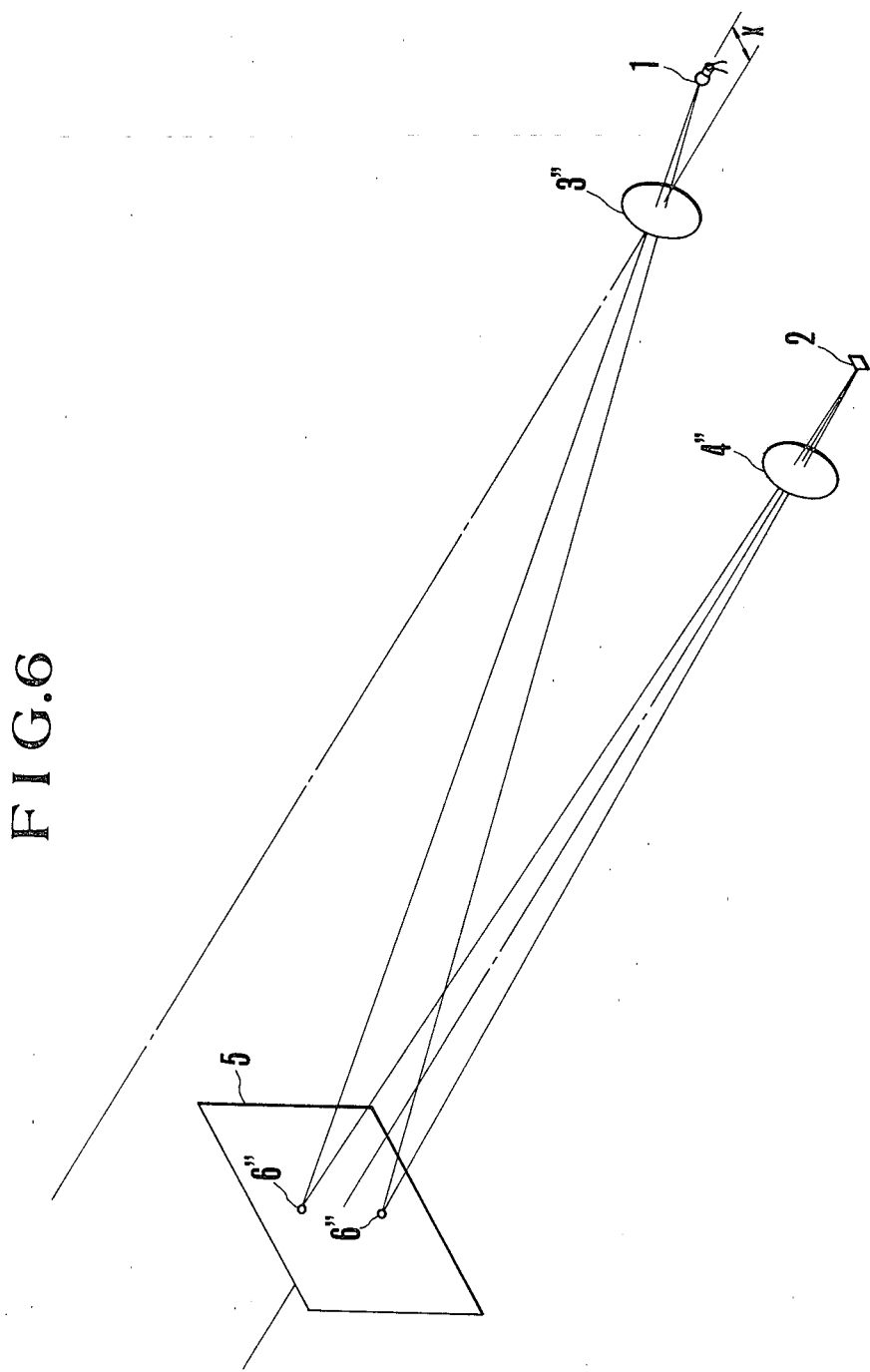
FIG. 6 shows a layout of the third example.
Figure 7:
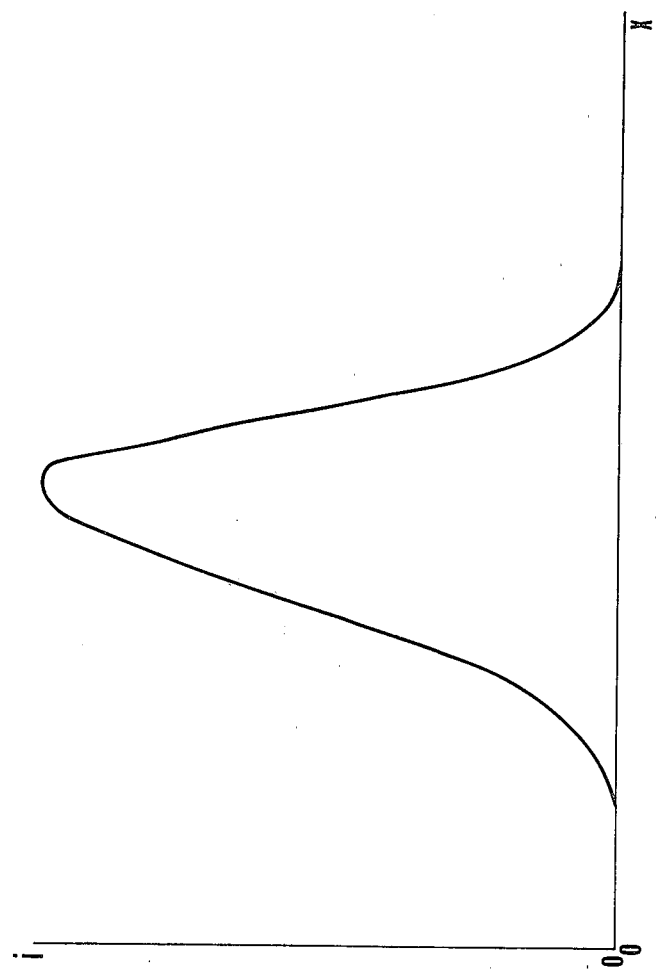
FIG. 7 is a line diagram to show outputs of a light receiving element in the third example.

In order to overcome said shortcoming, the third Example is shown in FIG. 6. That is, a beam projection lens 3'' having two optical axes is placed in a direction vertical to a scanning plane of a light emitting element 1, and a light receiving lens 4'' of an ordinary co-axial optical system, or a light receiving element having two optical axes, is placed in a direction vertical to the scanning plane as is the beam projection lens. When an ordinary optical system is used as the light receiving lens 4, it is desirable to use a light receiving element having a size which allows at least two images of spots 6'' formed in a vertical direction. Also, when two optical axes are used, a light receiving element of small area can be used. The output of the light receiving element in this case is shown in FIG. 7. The same effect may be obtained when a lens system having a plurality of optical axes is used, while an example of a two-axis optical system is shown above.

The above-mentioned type of lens having a plurality of optical axes can be easily produced by using plastics material.

I claim:

1. A range finder of the active type, comprising an optical system for projecting a light beam onto an object and scanning the object with the light beam, a light receiving element to receive light reflected from the object, said system having a light emitting element for emitting modulated visible light or infrared light, said system further including a beam projection lens composed of a plurality of parts each having a different optical axis and positioned in front of the light emitting element for simultaneously forming a plurality of images on the object.

2. A range finder of the active type according to claim 1, which further comprises a light receiving lens having a plurality of parts each having a different optical axis, said receiving lens being positioned in front of the light receiving element so that the light receiving element is in conjugate relation with the light emitting element, the receiving element being arranged for simultaneously receiving the plurality of images.

* * * * *